(No Model.)
C. C. BRADLEY.
AXLE NUT.
No. 372,957. Patented Nov. 8, 1887.
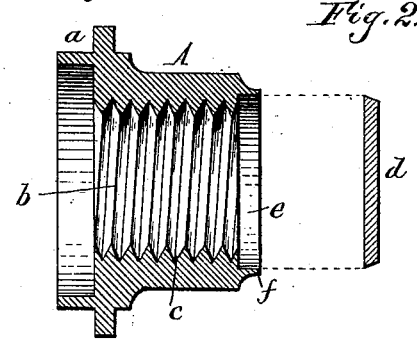
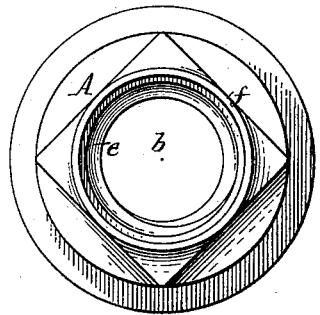
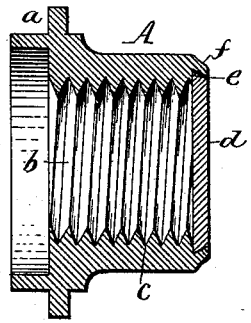
Theo. L. Popp
Geo. J. Buchheit
Witnesses.
C. C. Bradley Inventor.
By Wilhelm Bonner
Attorneys.

UNITED STATES PATENT OFFICE.

CHRISTOPHER C. BRADLEY, OF SYRACUSE, NEW YORK.

AXLE-NUT.

SPECIFICATION forming part of Letters Patent No. 372,957, dated November 8, 1887.

Application filed May 9, 1887. Serial No. 237,544. (No model.)

*To all whom it may concern:*

Be it known that I, CHRISTOPHER C. BRADLEY, of the city of Syracuse, in the county of Onondaga and State of New York, have invented a new and useful Improvement in Axle-Nuts, of which the following is a specification.

This invention relates to an improvement in that class of nuts which are closed at their outer ends and usually employed for securing the wheels to the axle-arms of vehicles. In nuts of this construction it is impossible to drive the screw-cutting tap into the nut far enough to form a thread of uniform depth and diameter, owing to the slight taper of the tap which produces a screw-thread of corresponding form in the nut. This tapered form of the screw-thread is objectionable, because in applying the nut a part of the thread is loose on the thread of the axle-arm, while the other part binds on the same and renders it difficult to apply the nut.

The object of my invention is to overcome this difficulty; and it consists in making the end of the nut open, so as to allow the screw-tap to be driven through the nut to form a thread of uniform depth and diameter, and then closing the open end of the nut, so as to give the same a smooth and finished appearance.

In the accompanying drawings, Figure 1 represents a vertical section showing my improved nut before its end is closed. Fig. 2 is a sectional view of the washer by which the end of the nut is closed. Fig. 3 represents a front elevation of the nut with the outer end thereof open. Fig. 4 is a vertical section of the finished nut.

Like letters of reference refer to like parts in the several figures.

A represents the body of the nut, which is provided at its inner end with the usual flange or shoulder, $a$, which abuts against the shoulder formed on the end of the axle-arm.

$b$ represents the central opening of the nut, extending from end to end thereof, and $c$ is the screw-thread formed in the same. The screw-thread $c$ is formed by inserting a screw-tap into the opening $b$ and driving the same into the opening far enough to form a screw-thread of uniform depth and diameter throughout the entire length of the opening. By making the outer end of the nut open the tap can be driven entirely through the nut, if desired, thereby forming all parts of the thread of the same diameter. When the screw-thread $c$ has been cut, the outer open end of the nut is closed by a disk, cover, or washer, $d$, which is placed in a circular seat or cavity, $e$, formed in the end of the nut, and secured therein by riveting or bending over the projecting circular flange or lip which surrounds the seat or cavity $e$. This may be accomplished by revolving the nut in a lathe and applying a square-edged tool to the flange $f$, or, if preferred, the flange may be turned over by a suitable riveting-tool. The flange $f$, when closed in this manner, overlaps the disk or washer $d$ and retains the same firmly in place on the end of the nut. When the washer $d$ has been secured in place, the nut is placed in a suitable lathe and faced, whereby the flange $f$ is turned flush with the washer $d$ and the adjacent portion of the nut. The outer end of the nut is thus given a smooth and finished appearance, and resembles in all respects the ordinary closed nut having its end formed in one piece with the body of the nut.

My improved nut can be manufactured at comparatively small expense. It permits a uniform thread to be formed throughout the entire length of the nut, thus preventing unequal binding of different parts of the thread, and it possesses the smooth and finished appearance of the ordinary solid nut.

I claim as my invention—

1. The combination, with a screw-nut having an open outer end, of a cover closing said opening and rigidly secured therein by bending over the adjacent portion of the nut, substantially as set forth.

2. The combination, with a nut having a screw-threaded opening extending throughout its length and provided at its outer end with a cavity or depression, $e$, and a flange, $f$, surrounding said cavity, of a disk or washer, $d$, seated in the cavity $e$ and rigidly secured therein by closing the flange $f$ over the edge of the washer, substantially as set forth.

Witness my hand this 4th day of May, 1887.

CHRISTOPHER C. BRADLEY.

Witnesses:
CALVIN S. BUNNELL,
ORLANDO C. WEST.